United States Patent Office 3,769,288
Patented Oct. 30, 1973

3,769,288
BICYCLIC NITROGENOUS COMPOUNDS
AND SALTS
Helmut Stähle, Herbert Köppe, Werner Kummer, and
Hans-Wolfgang Samtleben, Ingelheim am Rhein, Germany, assignors to Boehringer Ingelheim GmbH, Ingelheim am Rhein, Germany
No Drawing. Filed Apr. 12, 1972, Ser. No. 243,426
Claims priority, application Germany, Apr. 15, 1971,
P 21 18 261.6
Int. Cl. C07d 51/46
U.S. Cl. 260—256.4 F                6 Claims ABSTRACT OF THE DISCLOSURE
Compounds of the formula

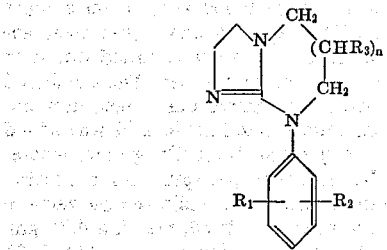

wherein
$R_1$ and $R_2$ are each hydrogen, halogen, alkyl of 1 to 3 carbon atoms, alkoxy of 1 to 2 carbon atoms, cyano or trifluoromethyl,
$R_3$ is hydrogen or hydroxy, and
$n$ is 0, 1 or 2,
and their non-toxic, pharmacologically acceptable acid addition salts; the compounds are useful as hypotensives, analgesics, sedatives and gastric juice secretion inhibitors.

This invention relates to novel bicyclic nitrogenous compounds and non-toxic, pharmacologically acceptable acid addition salts thereof, as well as to processes for preparing these compounds.

More particularly, the present invention relates to a novel class of compounds of the formula

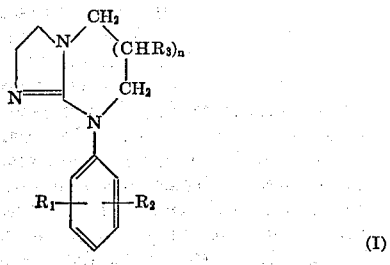

wherein
$R_1$ and $R_2$ are each hydrogen, halogen, alkyl of 1 to 3 carbon atoms, alkoxy of 1 to 2 carbon atoms, cyano or trifluoromethyl,
$R_3$ is hydrogen or hydroxy, and
$n$ is 0, 1 or 2,
and their non-toxic, pharmacologically acceptable acid addition salts.

The compounds embraced by Formula I may be prepared by either of the following processes;

(a) Reacting a phenylamino-imidazoline-(2) of the formula

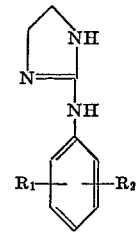

(II)

wherein $R_1$ and $R_2$ have the same meanings as in Formula I, with a bifunctional compound of the formula $$X\text{—}CH_2\text{—}(CHR_4)_n\text{—}CH_2\text{—}Y \quad \text{(III)}$$

wherein $n$ has the same meaning as in Formula I, and X and Y, which may be identical or different, are each halogen, preferably chlorine or bromine; and $R_4$ is hydrogen, hydroxyl or —OZ, where Z is a hydrolytically or hydrogenolytically removable protective group, via an intermediate of the formula

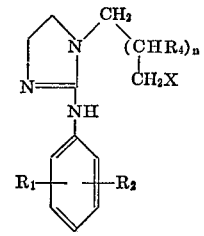

(IVa)

or

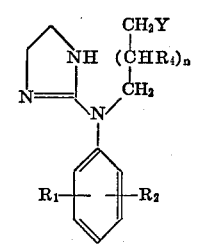

(IVb)

to produce a compound of the formula

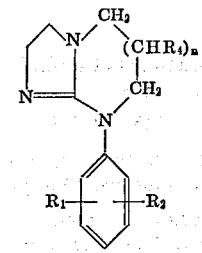

(V)

wherein $R_1$, $R_2$, $R_4$ and $n$ have the same meanings as in Formulas II and III; and, if necessary, removing the protective group Z by hydrolysis or hydrogenolysis to form a compound of the Formula I; and, if desired, converting the compound of the Formula I thus obtained into a non-toxic, pharmacologically acceptable acid addition salt thereof.

(b) Reacting a compound of the formula

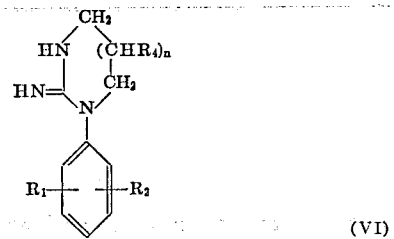

(VI)

wherein $R_1$, $R_2$, $R_4$ and $n$ have the same meanings as in Formulas II and III, with a bifunctional compound of the formula $$X-CH_2-CH_2-Y \quad (VII)$$

wherein X and Y have the same meanings as in Formula III to produce a compound of the Formula V, and, if necessary, removing the protective group Z by hydrolysis or hydrogenolysis to form a compound of the Formula I, and, if desired, converting the compound of the Formula I thus obtained into a non-toxic, pharmacologically acceptable acid addition salt thereof.

The condensation reaction according to process (a) is usually effected in polar protonic or aprotonic solvents or in a melt without using a solvent at a higher temperature, preferably from 100° C. to 200° C. Acid binding agents, such as sodium carbonate, sodium bicarbonate, calcium carbonate and the like, may be used in this reaction, but the addition thereof is not essential. The intermediates of the Formula IVa or IVb, which are formed during the condensation reaction, are normally not isolated. They readily cyclize into the compounds of the Formula V.

The reaction according to process (b) may be carried out either in the presence of polar protonic or polar aprotonic solvents or in the absence of any solvent at a higher temperature, advantageously from 60 to 180° C. Acid binding agents may optionally be used, but the addition of them is not essential.

The starting compounds needed for methods (a) and (b) are known compounds.

The compounds of the Formula I may be converted into their non-toxic, pharmacologically acceptable acid addition salts in the conventional way. Acids suitable for salt formation include, for example, inorganic mineral acids, such as hydrochloric acid, hydrobromic acid, hydroiodic acid, hydrofluoric acid, sulfonic acid, phosphoric acid or nitric acid; and organic acids, such as acetic acid, propionic acid, butyric acid, caproic acid, capric acid, valeric acd, oxalic acid, malonic acid, succinic acid, maleic acid, fumaric acid, lactic acid, tartaric acid, citric acid, malic acid, benzoic acid, p-hydroxybenzoic acid, p-aminobenzoic acid, phthalic acid, cinnamic acid, salicylic acid, ascorbic acid, methanesulfonic acid, 8-chlorotheophylline or the like.

The following examples further illustrate the present invention and will enable others skilled in the art to understand it more completely. It should be understood, however, that the invention is not limited solely to the particular examples given below.

EXAMPLE 1

8-(2',6'-dichlorophenyl)-2,3,5,6,7,8-hexahydro-6-hydroxyimidazo[1,2-a]pyrimidine A mixture consisting of 4.6 gm. (0.02 mol) of 2-(2',6'-dichlorophenyl-amino)-2-imidazoline and 1.42 gm. (0.011 mol) of 1.3-dichloro-2-propanol is heated to 140° C. in an oil bath. At that temperature an exothermic reaction occurred, raising the temperature to 180° C. While mechanically stirring the reaction mixture, the temperature of this mixture is maintained at 140° C. for an additional 30 minutes. After cooling the mixture, a solid mass was formed. This solid mass was dissolved in dilute hydrochloric acid, and the solution was buffered to pH 6 to 7 and then extracted with ether. The impurities and the unreacted starting material went into the ether phase. The remaining aqueous phase was subsequently salted out by adding sodium chloride thereto, whereby the resulting imidazo[1,2-a]pyrimidine compound precipitated. The precipitate was collected by vacuum filtration then washed with ice-cold water and dried. The yield was 1.0 gm. (17.5% of theory). This compound had a melting point of 237–239° C. Its nitrate, prepared in the conventional manner, melts at 151–153° C. In the thin-layer chromatogram the imidazo[1,2-a]pyrimidine proved to be uniform, and it was soluble in water and alcohol.

EXAMPLE 2

8-(2',6'-dichlorophenyl)-2,3,5,6,7,8-hexahydro-imidazo[1,2-a]pyrimidine

A mixture consisting of 6.9 gm. (0.03 mol) of 2-(2',6'-dichlorophenyl-amino)-2-imidazoline and 4.7 gm. (0.03 mol) of 1-chloro-3-bromo-propane was heated to 120° C. in an oil bath. At that temperature an exothermic reaction began, raising the temperature to 165° C. The reaction mixture was maintained at 150° C. for an additional 15 minutes and then cooled. The solidified mass was dissolved in 1 N hydrochloric acid and the solution was buffered to pH 6 to 7 and several times extracted with ether. The impurities and unreacted starting material went into the ether phase. The aqueous phase was then adjusted to a pH value of greater than 7, salted out with sodium chloride and extracted with ether. The combined ether extracts were dried over anhydrous magnesium sulfate and then filtered; concentrated nitric acid was added until the solution was slightly acidic to Congo red, whereby the nitrate of the imidazo[1,2-a]pyrimidine precipitated out in crystalline form. It was collected by vacuum filtration, washed with ether and dried, yielding 4.25 gm. (42.5% of theory), having a melting point of 165–168° C. After recrystallization from methanol/ether the compound had a melting point of 171–172° C. the substance proved to be uniform in the thin-layer chromatogram (system: ethyl acetate:isopropanol:conc.ammonia=70:50:20 coloring with potassium iodoplatinate).

EXAMPLE 3

9-(2',6'-dichlorophenyl)-6,7-dihydroxy-2,3,5,6,7,8-hexahydro-imidazo[1,2-a]diazepine A mixture consisting of 9.2 gm. (0.04 mol) of 2-(2',6'-dichlorophenyl-amino)-2-imidazoline, 10 gm. of 1,4-dibromobutanediol-2,3, 5.5 gm. of anhydrous potassium carbonate and 100 ml. of amyl alcohol was refluxed for 5 hours while stirring. Then the reaction mixture was evaporated in vacuo to dryness, and the residue was dissolved in 1 N hydrochloric acid. The acidic solution was extracted with ether (the ether extracts being discarded), made alkaline with a dilute sodium hydroxide solution, salted out with sodium chloride, and then extracted three times with ether. The combined organic phases were dried over anhydrous $MgSO_4$, filtered over charcoal and evaporated to dryness in vacuo. The resulting substance was triturated with acetone to cause crystallization, and the crystals were collected by vacuum filtration, then washed with acetone and dried. The yield was 2.8 gm. (22.1% of theory), and the compound had a melting point of 214–215° C. The substance was thin-layer-chromatographically uniform and was soluble in water and alcohol.

EXAMPLE 4

7-(2',6'-dichlorophenyl)-2,3,5,6-tetrahydro-imidazo[1,2-a]imidazole

A mixture consisting of 4.6 gm. (0.02 mol) of 2-(2',6'-dichlorophenyl-amino)-2-imidazoline, 7.5 gm. of 1,2-dibromo-ethane and 25 ml. of glycol monomethyl ether was heated for 9 hours in a sealed tube on a boiling water bath. Then the reaction mixture was evaporated in vacuo to dryness, and the residue was dissolved in dilute hydrochloric acid. To separate the resulting imidazo-imidazole the solution was fractionally etherized at different pH values (buffering with dilute sodium hydroxide solution). The extracts containing the desired compound (proof by thin-layer chromatogram) were dried over $MgSO_4$, and after filtration nitric acid was added until the solution was acidic to Congo red. The precipitating nitrate crystallized by the addition of acetone. It was collected by vacuum filtration, washed and dried. The yield was 0.6 gm. (9.4% of theory). The compound had a melting point of 122–124° C.

EXAMPLE 5

Using a procedure analogous to that described in Example 1, 8 - (2',3'-dichlorophenyl)-2,3,5,6,7,8-hexahydro-6-hydroxy-imidazo[1,2-a]pyrimidine, M.P. 191–192.5° C. (its nitrate had a M.P. of 178–179° C.) was prepared from 2 - (2',3'-dichlorophenyl-amino)-2-imidazoline and 1,3-dichloro-2-propanol. Yield: 22.7% of theory.

EXAMPLE 6

Using a procedure analogous to that described in Example 3, 9-(3'-chlorophenyl)-2,3,5,6,7,8-hexahydro-imidazo[1,2-a]diazepine, an oil, was prepared from 2-(3'-chlorophenyl-amino) - 2 - imidazoline and 1,4-dibromo-butane. Yield: 8.0% of theory.

EXAMPLE 7

Using a procedure analogous to that descrbied in Example 1, 8-(2'-chloro-4'-methyl-phenyl)-2,3,5,6,7,8-hexahydro - 6 - hydroxy-imidazo[1,2-a]pyrimidine, M.P. 185–188° C., was prepared from 2-(2'-chloro-4'-methyl-phenyl)-2-imidazoline and 1,3-dichloro - 2 - propanol. Yield: 4.7% of theory.

EXAMPLE 8

Using a procedure analogous to that described in Example 2, 8 - (2'-ethyl-phenyl)-2,3,5,6,7,8-hexahydro-imidazo[1,2-a]pyrimidine, an oil, was prepared from 2-(2'-ethylphenyl-amino)-2-imidazoline and 1-chloro-3-bromo-propane. Yield: 16.7% of theory.

EXAMPLE 9

Using a procedure analogous to that described in Example 1, 8 - (2',4'-dichlorophenyl)-2,3,5,6,7,8-hexahydro-6-hydroxy-imidazo[1,2-a]pyrimidine, was prepared from 2-(2',4'-dichlorophenyl-amino)-2-imidazoline and 1,3-dichloro-2-propanol. Yield: 21.5% of theory. Its nitrate had a M.P. of 156–158° C.

EXAMPLE 10

Using a procedure analogous to that described in Example 1, 8-(2'-ethyl-phenyl)-2,3,5,6,7,8-hexahydro-6-hydroxy-imidazo[1,2-a]pyrimidine was prepared from 2-(2'-ethylphenyl-amino)-2-imidazoline and 1,3-dichloro-2-propanol. Yield: 19.4% of theory. Its nitrate had a M.P. of 150–152° C.

EXAMPLE 11

Using a procedure analogous to that described in Example 1, 8-phenyl - 2,3,5,6,7,8 - hexahydro - 6 - hydroxy-imidazo[1,2-a]pyrimidine, M.P. 125–126° C., was prepared from 2-phenylamino - 2 - imidazoline and 1,3-dichloro-2-propanol. Yield: 16.7% of theory.

EXAMPLE 12

Using a procedure analogous to that described in Example 2, 8-phenyl-2,3,5,6,7,8 - hexahydro-imidazo[1,2-a]pyrimidine was prepared from 2-phenylamino-2-imidazoline and 1 - chloro-3-bromo-propane. Yield: 10.0% of theory. Its nitrate had a M.P. of 138–140° C.

EXAMPLE 13

Using a procedure analogous to that described in Example 3, 9-(2',4'-dichloro-phenyl) - 6,7 - dihydroxy-2,3,5,6,7,8 - hexahydro-imidazo[1,2-a]diazepine, M.P. 213–214° C., was prepared from 2 - (2',4' - dichlorophenyl-amino)-2-imidazoline and 1,4 - dibromo-butanediol-2,3. Yield: 10.6% of theory.

EXAMPLE 14

Using a procedure analogous to that described in Example 1, 8 - (4'-cyano-phenyl)-2,3,5,6,7,8-hexahydro-6-hydroxy-imidazo[1,2-a]pyrimidine, M.P. 216–217° C., was prepared from 2-(4'-cyanophenyl-amino)-2-imidazoline and 1,3-dichloro-2-propanol. Yield: 12.1% of theory.

EXAMPLE 15

Using a procedure analogous to that described in Example 1, 8 - (2',5'-dimethoxyphenyl)-2,3,5,6,7,8-hexahydro-6-hydroxy-imidazo[1,2-a]pyrimidine, M.P. 164–166° was prepared from 2 - (2',5'-dimethoxyphenyl-amino)-2-imidazoline and 1,3-dichloro-2-propanol. Yield: 67.8% of theory.

EXAMPLE 16

Using a procedure analogous to that described in Example 1, 8 - (3'-bromo-phenyl)-2,3,5,6,7,8-hexahydro-6-hydroxy - imidazo[1,2-a]pyrimidine, M.P. 159–160° C., was prepared from 2-(3'-bromophenyl-amino)-2-imidazoline and 1,3-dichloro-2-propanol. Yield: 15.2% of theory.

EXAMPLE 17

Using a procedure analogous to that described in Example 1, 8 - (2'-methyl - 4' - bromo-phenyl)-2,3,5,6,7,8-hexahydro - 6 - hydroxy-imidazo[1,2-a]pyrimidine, M.P. 205–207° C., was prepared from 2-[(2'-methyl-4'-bromophenyl)-amino]-2-imidazoline and 1,3 - dichloro-2-propanol. Yield: 35.6% of theory. Its nitrate had a M.P. of 154–156° C.

EXAMPLE 18

Using a procedure analogous to that described in Example 1, 8 - (2'-trifluoromethyl-phenyl)-2,3,5,6,7,8-hexahydro-6-hydroxy-imidazo[1,2-a]pyrimidine, was prepared from 2-[(2' - trifluoromethyl-phenyl)-amino]-2-imidazoline and 1,3-dichloro-2-propanol. Yield: 35.1% of theory. Its nitrate had a M.P. of 177° C.

EXAMPLE 19

Using a procedure analogous to that described in Example 1, 8 - (4'-fluoro-phenyl)-2,3,5,6,7,8-hexahydro-6-hydroxy - imidazo[1,2-a]pyrimidine, M.P. 153° C., was prepared from 2 - (4'-fluorophenyl-amino)-2-imidazoline and 1,3-dichloro-2-propanol. Yield: 26.6% of theory.

EXAMPLE 20

Using a procedure analogous to that described in Example 1, 8-(2',5'-dichloro-phenyl)-2,3,5,6,7,8-hexahydro-6-hydroxy-imidazo[1,2-a]pyrimidine, M.P. 191–193° C., was prepared from 2 - (2',5' - dichlorophenyl-amino)-2-imidazoline and 1,3-dichloro-2-propanol. Yield: 36.1% of theory. Its nitrate had a M.P. of 161.5–163.5° C.

EXAMPLE 21

Using a procedure analogous to that described in Example 4, 7 - (2'-chloro - 4' - methyl-phenyl)-2,3,5,6,7,8-tetrahydro-imidazo[1,2-a]imidazole was prepared from 2-[(2'-chloro-4'-methyl-phenyl)-amino] - 2 - imidazoline and 1,2-dibromo-ethane. Yield: 4.3% of theory. Its maleate had a M.P. of 100–103° C.

EXAMPLE 22

7-(2',6'-dichloro-phenyl)-2,3,5,6-tetrahydro-imidazo[1,2-a]imidazole by process (b)

A mixture consisting of 3.6 gm. (0.0157 mol) of 1-(2',6'-dichloro-phenyl) - 2 - imino-imidazolidine and 4.5 gm. (150%) of ethylenebromide was heated at 165–175° C. in an oil bath for 15 minutes. After cooling, the reaction mixture was dissolved in dilute hydrochloric acid. The solution was purified with charcoal and was several times etherized (the ether extracts were discarded). Sodium hydroxide solution was then added to make it alkaline, whereupon the solution was extracted with ether. After drying the combined ether fractions over anhydrous magnesiumsulfate, the ether was distilled off in vacuo, and the resulting residue was chromatographed on $Al_2O_3$ with chloroform as eluant. Those fractions containing the desired compound in pure form (proof by thin-layer chromatography by comparison with authentic material) were combined and freed from solvent, yielding 0.25 gm. of pure imidazo[1,2-a]imidazole as an oil. After digestion with ether, crystallization of the oil occurs. The yield was 0.18 gm., (4.4% of theory). The compound had a melting point of 128–130° C. When authentic material is added to this purified product there is no depression of the melting point.

EXAMPLE 23

7-(2',6'-dichloro-phenyl)-2,3,5,6-tetrahydro-imidazo[1,2-a]imidazole by process (a)

4.8 gm. of thionyl chloride are slowly dropped into a solution of 5.5 gm. (0.02 mol) of 1-(β-hydroxy-ethyl)-2-(2',6'-dichlorophenyl-amino)-imidazoline-(2) in 17 ml. of chloroform while stirring. The reaction mixture was then refluxed for about 3 hours and subsequently evaporated to dryness in vacuo. 3.4 gm. of powdered potassium hydroxide and 50 ml. of absolute methanol were added to the residue consisting of crude 1-(β-chloroethyl)-2-(2',6' - dichlorophenyl-amino)-imidazoline-(2), and the resulting mixture was refluxed for 2 hours. After cooling, the precipitated potassium chloride was removed by filtration, and the filtrate was distilled in vacuo. To purify the crude material, the resulting imidazo[1,2-a]imidazole was dissolved in dilute hydrochloric acid and the solution was digested with charcoal. After filtration, a 50% aqueous solution of potassium hydroxide was added, whereby the desired compound separated out as an oil which crystallized after a short time. It was collected by vacuum filtration washed with a little ice water and dried, yielding 3.5 gm. (68.5% of theory). The compound had a M.P. of 124–126° C. The mixed melting point determination with authentic material produced no depression. Thin-layer chromatography, IR and NMR spectroscopy proved that the compound prepared above was identical to 7 - (2',6'-dichlorophenyl)-2,3,5,6-tetrahydro-imidazo[1,2-a]imidazole prepared according to process (b) in the preceding example.

As indicated above, the compounds according to the present invention, that is, those embraced by Formula I above and their non-toxic, pharmacologically acceptable acid addition salts, have useful pharmacodynamic properties. More particularly, the compounds of the instant invention exhibit hypotensive, analgesic, sedative and gastric juice secretion inhibiting actvities to varying degrees in warm-blooded animals, such as mice and rats.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories, and the like. One effective dosage unit of the compounds according to the present invention is from 0.0016 to 1.67 mgm./kg. body weight, preferably 0.083 to 0.84 mgm./kg. body weight for oral administration.

The following examples illustrate a few dosage unit compositions comprising a compound of the present invention as an active ingredient and represent the best modes contemplated of putting the invention into practical use. The parts are parts by weight unless otherwise specified.

EXAMPLE 24

Tablets

The tablet composition was compounded from the following ingredients:

| | Parts |
|---|---|
| 8 - (2',6' - dichloro - phenyly)-2,3,5,6,7,8-hexahydro-imidazo[1,2-a]pyrimidine nitrate | 10 |
| Lactose | 33 |
| Corn starch | 30 |
| Colloidal silicic acid | 1 |
| Magnesium stearate | 1 |
| Total | 75 |

Preparation.—The active ingredient was admixed with part of the pharmaceutical carriers, kneaded with corn starch slurry and granulated in the conventional manner using a screen. The resulting granulate was admixed with the remainder of the carriers and compressed into tablets, each having a weight of 75 mgm. Each tablet contained 10 mgm. of the imidazo[1,2-a]pyrimidine compound and is an oral dosage unit composition with effective hypotensive, analgesic, sedative and gastric juice secretion inhibiting activties.

EXAMPLE 25

Coated tablets

The tablet core composition was compounded from the following ingredients:

| | Parts |
|---|---|
| 8 - (2',6' - dichloro - phenyly)-2,3,5,6,7,8-hexahydro-imidazo[1,2-a]pyrimidine nitrate | 15 |
| Lactose | 33 |
| Corn starch | 30 |
| Colloidal silicic acid | 1 |
| Magnesium stearate | 1 |
| Total | 80 |

Preparation.—A granulate was prepared from lactose, corn starch and colloidal silicic acid with the aid of a starch slurry. The active ingredient and magnesium stearate were admixed; and the composition was compressed into 80 mgm.-tablet cores which were then coated with talcum and gum arabic in the usual manner. Each coated tablet contained 15 mgm. of the imidazo[1,2-a]pyrimidine compound and is an oral dosage unit composition with effective hypotensive, analgesic, sedative, and gastric juice secretion inhibiting activties.

Analogous results are obtained when any one of the other compounds embraced by Formula I or a non-toxic pharmacologically acceptable acid addition salt thereof is substituted for the particular imidazo[1,2-a]pyrimidine in Examples 24 and 25. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to other skilled in the art that the invention is not limited to these particular embodiments, and that various changes and modifications may be made without departing from the spirit of the invention or the scope of the appended claims.

We claim:
1. A compound of the formula

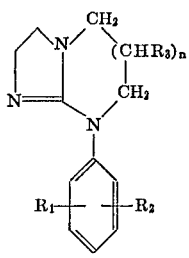

wherein
$R_1$ and $R_2$ are each hydrogen, halogen, alkyl of 1 to 3 carbon atoms, alkoxy of 1 to 2 carbon atoms, cyano or trifluoromethyl,
$R_3$ is hydrogen or hydroxy, and
$n$ is 0, 1 or 2.
or a non-toxic, pharmacologically acceptable acid addition salt thereof.

2. A compound of claim 1 wherein $R_1$ and $R_2$ are each fluorine, chlorine or bromine.

3. A compound according to claim 1, which is 8-(2',6'-dichloro - phenyl) - 2,3,5,6,7,8 - hexahydro-6-hydroxy-imidazo[1,2-a]pyrimidine or a non-toxic, pharmacologically acceptable acid addition salt thereof.

4. A compound according to claim 1, which is 8-,2',6'-dichloro - phenyl) - 2,3,5,6,7,8-hexahydro-imidazo[1,2-a]pyrimidine, or a non-toxic, pharmacologically acceptable acid addition salt thereof.

5. A compound according to claim 1, which is 9-(2',6'-dichloro - phenyl) - 6,7-dihydroxy-2,3,5,6,7,8-hexahydro-imidazo[1,2-a]diazepine, or a non-toxic, pharmacologically acceptable acid add tion salt thereof.

6. A compound according to claim 1, which is 7-(2',6'-dichloro - phenyl) - 2,3,5,6 - tetrahydro-imidazo[1,2-a]imidazole, or a non-toxic, pharmacologically acceptable acid addition salt thereof.

References Cited
UNITED STATES PATENTS
2,782,205   2/1957   McKay et al. _____ 260—309.6

ALEX MAZEL, Primary Examiner

R. V. RUSH, Assistant Examiner

U.S. Cl. X.R.
260—239 BC, 256.4 H, 309.6, 309.7; 424—251, 273